May 9, 1939.  A. E. BRICKMAN ET AL  2,157,227
ROPE COUPLING
Filed March 2, 1938
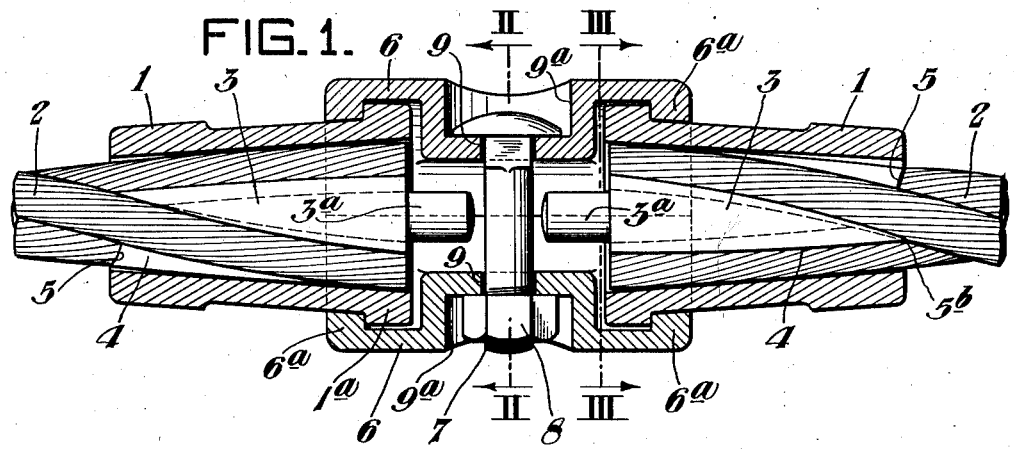
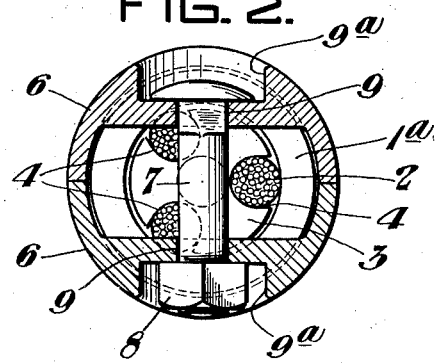
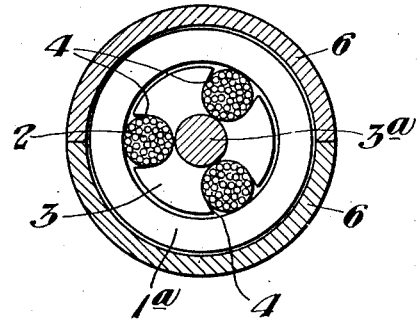
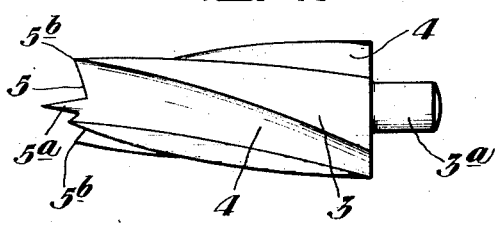
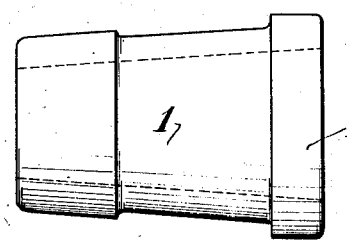
Inventors:
ALAN E. BRICKMAN and
GEORGE A. GLEASON.
by
their Attorneys.

Patented May 9, 1939

2,157,227

UNITED STATES PATENT OFFICE 2,157,227

ROPE COUPLING

Alan E. Brickman and George A. Gleason, Worcester, Mass., assignors to The American Steel and Wire Company of New Jersey, a corporation of New Jersey Application March 2, 1938, Serial No. 193,581

7 Claims. (Cl. 24—126)

This invention relates to couplings for interfastening adjacent ends of oppositely extending ropes. It is particularly concerned with couplings for fastening the ends of wire ropes used as guard rail elements in the case of road guards of the cable type.

A specific example of a coupling embodying the features of the invention is illustrated by the accompanying drawing, in which:

Figure 1 is a longitudinal section of the coupling;

Figures 2 and 3 are cross-sections taken from the lines II—II and III—III, respectively, in Figure 1;

Figure 4 shows a detail of the coupling; and

Figure 5 shows another detail of the coupling.

More specifically, the illustrated coupling includes two conical sockets 1 for receiivng the rope ends 2. Upon insertion in these sockets, wedges 3 are driven into the rope ends to spread the same. These wedges have helical rope strand-receiving grooves 4, and the leading edges 5 of their portions between these grooves are sharpened to facilitate initial entry into the rope ends between the rope strands.

The sockets 1 have smooth interior surfaces for reducing the friction between them and the rope ends to factors below those of the friction between the rope ends and the wedges, or in other words, so there is less friction between the rope ends and socket interiors than between these ends and the wedges, whereby the rope ends and wedges tend to be drawn together further into the sockets when the latter are restrained and the ropes are tensioned. This assures security.

A separable connector serves to interconnect the sockets 1. This is in the form of two semi-cylinders 6 which can be clamped together about the socket 1 by means of a transverse bolt 7 provided with a nut 8. Positive engagement between the connector and sockets results by reason of the sockets having outwardly extending flanges 1ᵃ which fit within flanges 6ᵃ extending inwardly from the semi-cylinders 6.

Permanent projections 3ᵃ extend from the rear ends of the wedges 3 so as to interfere with installation of the bolt 7 in case the wedges are not properly driven into the rope ends. That is to say, the mutually adjacent ends of the two projections 3ᵃ must be sufficiently spaced before the bolt 7 can pass between them, this meaning that the wedges must be driven securely into the sockets 1 before the bolt can be positioned to effect its installation. As a result, the coupling cannot be completely assembled unless the wedges are properly positioned.

The bolt 7 passes through suitable openings 9 formed in the semi-cylinders 6, the latter providing recesses 9ᵃ for receiving the head of the bolt 7 and the nut 8. As a result of this arrangement, a socket wrench is needed to loosen the assembly. This diminishes the chances of vandalism when the coupling is exposed to the public. Furthermore, this feature, in conjunction with the generally smooth contour of the various parts, results in a coupling that will not unduly damage colliding traffic sliding along the ropes.

Referring again to the wedges 3, these have, in each instance, in addition to their sharpened leading edges 5, a central projection 5ᵃ which tapers to a point to provide a means for initially spreading the rope strands. The latter are then guided into the grooves 4 with the aid of the strand separating edges 5. In addition, these edges curve or angle forwardly from the projection 5ᵃ to pointed extremes 5ᵇ which function to enter the outer interstices of the rope strands prior to operation of the leading edges 5, and thus provide further assurance of proper and positive strand guidance toward the strand receiving grooves of the wedge. In use, the projection 5ᵃ initially enters the rope center, which is hollow in the case of the 3-strand rope illustrated, the points 5ᵇ subsequently entering the outer strand interstices so the strands are positively held when the sharpened edges 5 begin the work. These various phases, of course, follow in such rapid sequence when the wedge is hit with a hammer as to seemingly occur simultaneously.

We claim:

1. A wire rope fitting including a conical socket for receiving a rope end and a wedge having rope strand receiving grooves for spreading the rope end in said socket, said wedge having the leading edges of its portions between said grooves sharpened to facilitate its initial entry into the rope end.

2. A wire rope fitting including a conical socket for receiving a rope end and a wedge having rope strand receiving grooves for spreading the rope end in said socket, said wedge having the leading edges of its portions between said grooves sharpened to facilitate its initial entry into the rope end, said socket providing a smooth surface for reducing the friction between it and the rope end to a lower factor than that of the friction between the rope end and said wedge, whereby the rope end and wedge tend to be drawn together further into said socket when the latter is restrained and the rope is tensioned.

3. A wire rope fitting including a conical socket for receiving a rope end and a wedge having rope strand receiving grooves for spreading the rope end in said socket, said fitting being provided with a connector adapted to be applied to said socket and having a transverse fastening element, the rear end of said wedge having a permanent projection interfering with the installation of said element unless said wedge is driven properly into the rope end, whereby said fitting cannot be completely assembled unless said wedge is properly positioned.

4. A coupling for interfastening the adjacent ends of oppositely extending wire ropes, including two conical sockets for receiving the two rope ends, wedges having rope strand receiving grooves for spreading the rope ends in said sockets, said wedges having the leading edges of their portions between said grooves sharpened to facilitate their initial entry into the rope ends, said sockets providing smooth surfaces for reducing the friction between them and the rope ends to factors below those of the friction between the rope ends and said wedges, whereby the rope ends and wedges tend to be drawn together further into said sockets when the latter are restrained and the ropes are tensioned, a separable connector for application about said sockets to interconnect the same and a transverse fastening for clamping together the parts of said connector about said sockets, the rear ends of said wedges having permanent projections interfering with installation of said element unless said wedges are properly driven into the rope ends, whereby the coupling cannot be completely assembled unless said wedges are properly positioned.

5. A coupling for interfastening the adjacent ends of oppositely extending wire ropes, including two conical sockets for receiving the two rope ends, wedges having rope strand receiving grooves for spreading the rope ends in said sockets, said wedges having the leading edges of their portions between said grooves sharpened to facilitate their initial entry into the rope ends, said sockets providing smooth surfaces for reducing the friction between them and the rope ends to factors below those of the friction between the rope ends and said wedges, whereby the rope ends and wedges tend to be drawn together further into said sockets when the latter are restrained and the ropes are tensioned, a separable connector for application about said sockets to interconnect the same and a transverse fastening for clamping together the parts of said connector about said sockets, the rear ends of said wedges having permanent projections interfering with installation of said element unless said wedges are properly driven into the rope ends, whereby the coupling cannot be completely assembled unless said wedges are properly positioned, said fastening being a bolt and nut and said connector having transverse openings for said bolt and recesses for its head and for said nut, whereby a socket wrench is needed to loosen the assembly and the chances of vandalism are diminished when the coupling is exposed to the public.

6. A wire rope fitting including a conical socket for receiving a rope end and a wedge having rope strand receiving grooves for spreading the rope end in said socket, said wedge having the leading edges of its portions between said grooves sharpened to facilitate its initial entry into the rope end and having a central projection extending beyond said edges so as to initially enter the strand center when the wedge is forced into the rope end.

7. A wire rope fitting including a conical socket for receiving a rope end and a wedge having rope strand receiving grooves for spreading the rope end in said socket, said wedge having the leading edges of its portions between said grooves sharpened to facilitate its initial entry into the rope end and having a central projection extending beyond said edges so as to initially enter the strand center when the wedge is forced into the rope end, said edges extending forwardly away from said projection to pointed extremes positioned to enter the outer strand interstices of the rope.

ALAN E. BRICKMAN.
GEORGE A. GLEASON.